Sept. 10, 1929.   L. W. SCHWENK   1,727,523
CARBOY LOADER, MOVER, AND TILTER
Filed Jan. 11, 1928
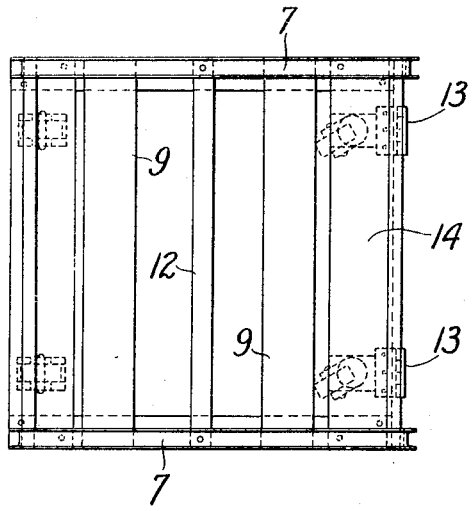
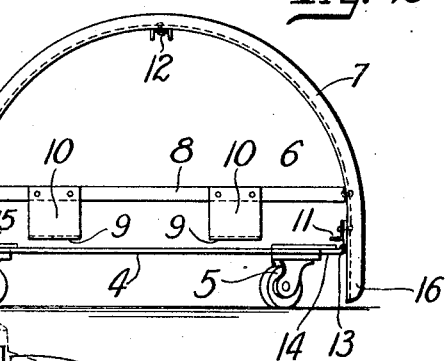
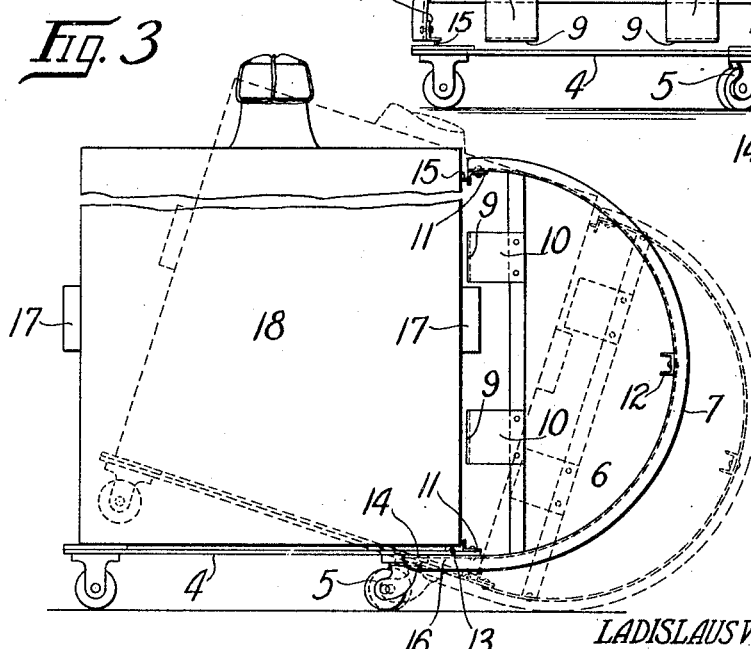
INVENTOR.
LADISLAUS W. SCHWENK
BY
Mason, Fenwick & Lawrence
ATTORNEYS.

Patented Sept. 10, 1929.

1,727,523

UNITED STATES PATENT OFFICE.

LADISLAUS W. SCHWENK, OF FLUSHING, NEW YORK.

CARBOY LOADER, MOVER, AND TILTER.

Application filed January 11, 1928. Serial No. 246,072.

My invention relates to means for loading, moving, tilting and discharging and unloading carboys, and consists primarily, in its present preferred form, of a wheeled truck, on which the carboy is loaded and moved, and a rocker frame hinged to the end of the truck, by which the carboy may be conveniently placed, rocked and loaded upon the truck, and tilted for discharging the contents of the carboy, and unloaded from the truck, substantially as hereinafter set forth.

In order that my invention may be clearly understood, I shall first describe in detail the mode in which I at present prefer to carry the invention into practice, and then particularly point out the invention in the claims.

Reference is to be had to the accompanying drawings forming part of this application in which like parts are designated by the same numbers in all the figures.

Figure 1 is a plan view of a carboy loader, mover, and tilter embodying my invention, folded as when not in use.

Figure 2 is a side elevation of the same.

Figure 3 is a side elevation showing a carboy loaded on the device and indicating the method of tilting the carboy.

In the specific embodiment of my invention thus shown, 4 designates the platform of a wheeled truck on which the carboy is loaded and carried, and 5 the casters of the same which are preferably swiveled to the platform 4 for greater ease in turning the truck.

To one end of the platform 4 is hinged a rocker frame 6 consisting of a pair of rigid semi-circular members 7, 7, preferably of iron or steel, one on each side of the truck, bowed away from the truck and having each a transverse chord member 8 rigidly connecting its arms near the ends.

The chord members 8 of the two rocker members 7 are also rigidly connected by transverse rigid U-shape members 9, preferably of steel, whose upturned end arms 10 are rigidly secured to the respective chord members 8.

The ends of the respective rocker members 7, 7, on each side of the truck are further rigidly connected by rigid transverse members 11, in this case angle irons, and the crowns of the rocker members 7, 7, are also rigidly connected by a transverse member 12, in this case a channel iron.

A very rigid and strong rocker frame 6 is thus formed which is able to carry the carboy independently of the truck as hereinafter set forth.

The rocker frame 6 is hinged to the forward end of the truck, preferably by hinges 13 connecting the forward transverse member 11 of the rocker frame to the forward transverse member 14 of the truck, and the lower ends of the forward arms of the rocker members 7, project normally below the hinges 13.

On the rear or upper transverse member 11 of the rocker frame are preferably fixed teeth 15.

With this construction and arrangement the carboy 16 (indicated in dotted lines in Figure 3) can be loaded on the platform 4 of the truck after the rocker frame, which when not in use rests on the platform 4 as indicated in Figure 2, has been swung forward to the upright position shown in Figure 3, the projecting ends 16 of the rocker members 7, then abutting and acting as stops against the underside of the platform 4.

The teeth 15 on the transverse members 11, then bite or indent the carboy so as to hold the same in positon against the rocker frame, and the U-shape transverse members 9 embrace the band 17 on the carboy so as to keep the carboy in place.

To discharge the contents of the carboy the rocker frame is tilted further forward as desired, as indicated in Figure 3, the rocker members 7 of the rocker frame rocking on the ground and the carboy being held in place as described on its flat, inner, rear or upper side.

To load and unload the carboy the rocker frame is rocked on the ground still further forward, to a position convenient to receive the carboy thereon or remove it therefrom. Reversely the rocker frame 6 carrying the carboy on its flat side is tilted rearward to deposit the carboy on the truck and move the same where desired.

The whole construction and arrangement forms a very simple, strong, and convenient device for loading and unloading, moving and discharging carboys, which when filled, are ordinarily very heavy and difficult to handle.

It is evident that many changes may be made in the specific details of this embodiment of my invention without departing from the boundaries of my invention as defined by the following claims.

I claim as my invention:

1. A carboy loader, mover and tilter comprising a wheeled truck, and a rocker frame hinged near its forward and lower end to the forward end of the truck, and having rocker members on its outer side to rock on the ground, and a relatively flat inner side to rest normally on the truck and when swung forward to act as a rest for the carboy.

2. A carboy loader, mover and tilter according to claim 1, in which the forward ends of the rocker members project below the hinged joint to abut and act as a stop against the underside of the truck platform.

3. A carboy loader, mover and tilter according to claim 1, in which the inner side of the rocker frame is provided with inwardly projecting transverse members to embrace the band of the carboy.

4. A carboy loader, mover and tilter according to claim 1, in which the rocker frame is constructed of a plurality of longitudinal outwardly bowed rocker members, longitudinal members rigidly connecting the arms of the respective rocker members, transverse members rigidly connecting the ends and crowns of the rocker members.

In testimony whereof I affix my signature.

LADISLAUS W. SCHWENK.